United States Patent
Kai

[11] Patent Number: 6,137,435
[45] Date of Patent: Oct. 24, 2000

[54] ONBOARD RADAR APPARATUS

[75] Inventor: Koichi Kai, Tokyo, Japan

[73] Assignee: Mitsubishi Denki Kabushiki Kaisha, Tokyo, Japan

[21] Appl. No.: 09/370,925

[22] Filed: Aug. 10, 1999

[30] Foreign Application Priority Data

May 12, 1999 [JP] Japan .................................. 11-131637

[51] Int. Cl.[7] .................................................. G01S 13/93
[52] U.S. Cl. .............................. 342/70; 342/99; 342/109; 342/115; 342/159
[58] Field of Search ................................. 342/70, 71, 72, 342/89, 98, 99, 107, 109, 115, 128, 129, 134, 135, 159, 162, 192, 195, 203

[56] References Cited

U.S. PATENT DOCUMENTS 4,348,675  9/1982  Senzaki et al. ............................ 342/71

FOREIGN PATENT DOCUMENTS

2765767  4/1998  Japan .

*Primary Examiner*—John B. Sotomayor
*Attorney, Agent, or Firm*—Sughrue, Mion, Zinn, Macpeak & Seas, PLLC

[57] ABSTRACT

The present invention relates to an onboard radar apparatus having a receiving and transmitting device for transmitting electromagnetic waves to objects and receiving the electromagnetic waves reflected by the objects repeatedly, and a signal processing device for repeatedly calculating relative ranges and relative velocities of the objects based on the transmitting electromagnetic waves and the receiving electromagnetic waves, wherein false images are judged by comparing their relative velocities, calculated from differences between the relative ranges of the objects in previous measurement and the relative ranges of the objects in current measurement, with said relative velocities of the objects, calculated based on the transmitting electromagnetic waves and the receiving electromagnetic waves in the current measurement; and thus judged false images are deleted from outputs of the apparatus, whereby the false images are not recognized as target objects and probability of occurrence of false images can be reduced.

8 Claims, 7 Drawing Sheets

IMAGES OF TRANSMITTING AND RECEIVING SIGNALS

PRIOR ART
FIG. 9a

SPECTRA OF BEAT SIGNAL WHEN RECEIVING FREQUENCY BECOMES LARGER THAN TRANSMITTING FREQUENCY

PRIOR ART
FIG. 9b

SPECTRA OF BEAT SIGNAL WHEN RECEIVING FREQUENCY BECOMES LARGER THAN TRANSMITTING FREQUENCY

ONBOARD RADAR APPARATUS

BACKGROUND OF THE INVENTION

1. Field of the Invention

The present invention relates to an onboard radar apparatus.

2. Discussion of Background

Figure 7:
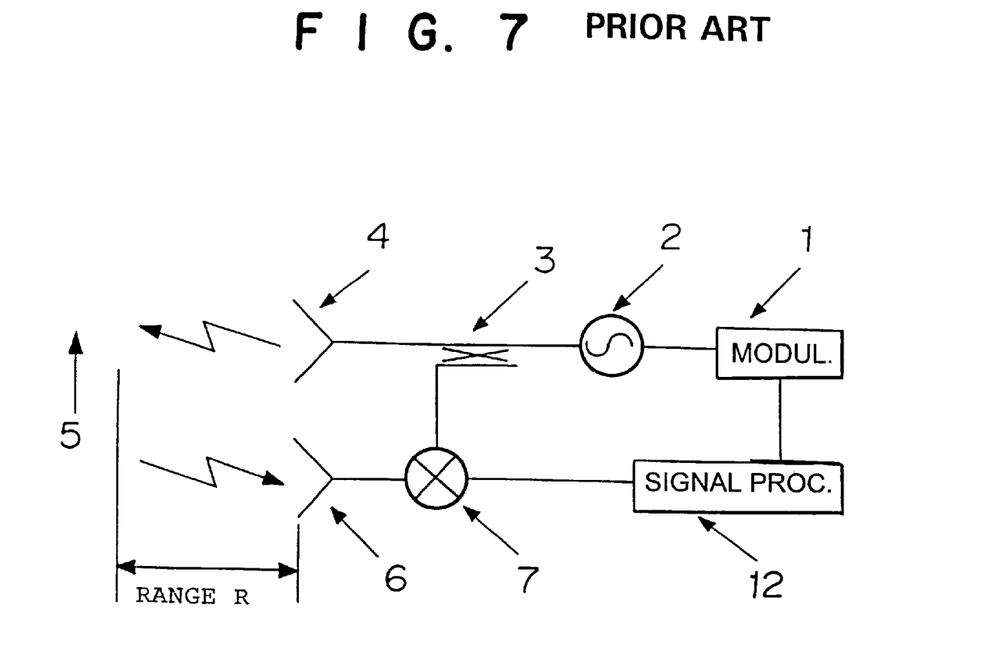
FIG. 7 is a block chart for illustrating a conventional onboard radar apparatus.

For example, illustrated in FIG. 7 is known as an onboard radar apparatuses. In FIG. 7, numerical reference 1 designates a modulator; numerical reference 2 designates a voltage-controlling oscillator; numerical reference 3 designates a power divider; numerical reference 4 designates a transmitting antenna; numerical reference 5 designates an object; numerical reference 6 designates a receiving antenna; numerical reference 7 designates a mixer; and numerical reference 12 designates a signal processing device.

Operations of thus-constructed conventional apparatus will be described. The modulator 1 outputs linear voltage signals for frequency modulation (FM) composed of triangular waves. The voltage-controlling oscillator 2 generates electromagnetic waves subjected to frequency modulation by receiving these voltage signals for frequency modulation. These electromagnetic waves are divided into two portions by the power divider 3. One of the portions is inputted into the mixer 6. The other portion is outputted from the transmitting antenna 4 into space. The electromagnetic waves, i.e. transmitting electromagnetic waves, outputted into space from the transmitting antenna 4 are reflected by an object 5 and inputted in the receiving antenna 6 after a delay time Td with respect to the transmitting electromagnetic waves. In case that the object 5 has a relative velocity with respect to the radar apparatus, the receiving electromagnetic waves are inputted in the receiving antenna 6 with a Doppler shift Fd with respect to the transmitting electromagnetic waves. The electromagnetic waves received by the receiving antenna 6, i.e. receiving electromagnetic waves, are mixed with the transmitting electromagnetic waves by the mixer 7, and the mixer outputs beat signals corresponding to the delay time Td and the Doppler shift Fd. The signal processing device 12 calculates a relative range and the relative velocity with respect to the object using the beat signals.

Figure 8:
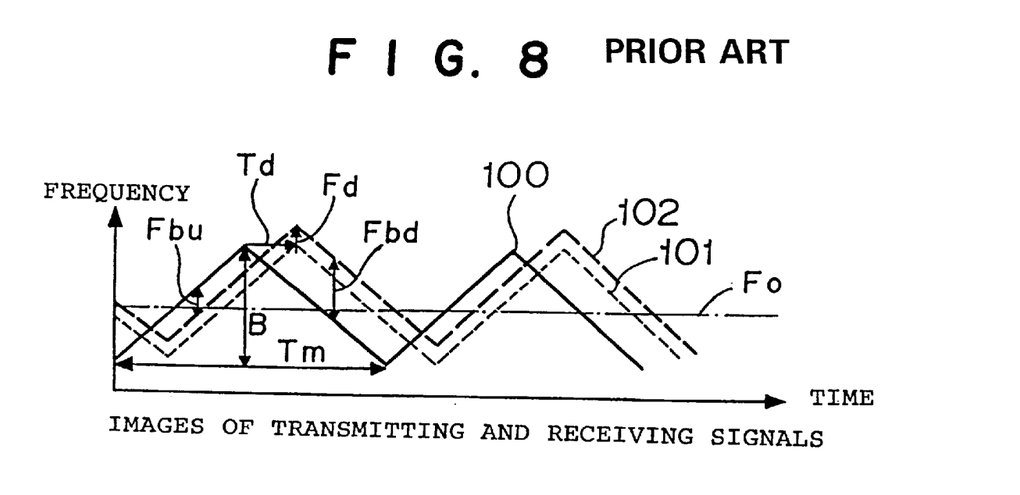
FIG. 8 is a graph of waveform for illustrating transmitting signals and receiving signals of a conventional onboard radar apparatus.

In the next, a method of calculating the relative range and the relative velocity will be described. FIG. 8 illustrates an example of calculating the relative range and the relative velocity using the above-mentioned radar apparatus. In FIG. 8, numerical reference 100 designates a transmitting electromagnetic wave; reference B designates a frequency band width in sweeping of the transmitting electromagnetic wave; and reference Tm designates a modulation period, wherein the transmitting electromagnetic wave 100 is subjected to a frequency modulation to have the frequency band width B and the modulation Tm. Numerical references 101 and 102 designate receiving electromagnetic waves; reference R designates a range; and reference Td designates a delay time between the transmitting electromagnetic wave and the receiving electromagnetic waves, namely from reflection by the object positioned at the range R to an input in the receiving antenna.

Figure 9A:
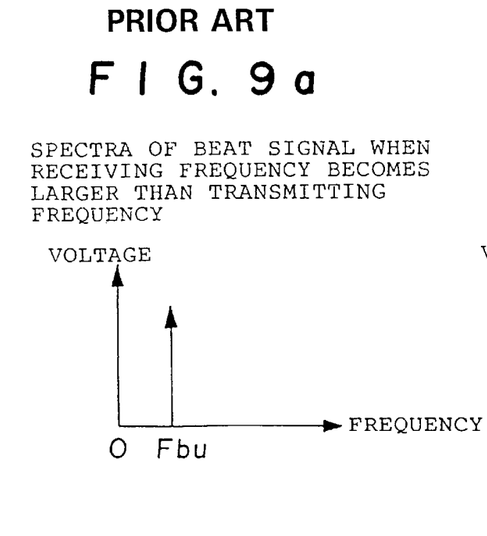
FIG. 9a is a graph for illustrating a frequency spectrum of a beat signal when transmitting frequency is increased in a conventional onboard radar apparatus.
Figure 9B:
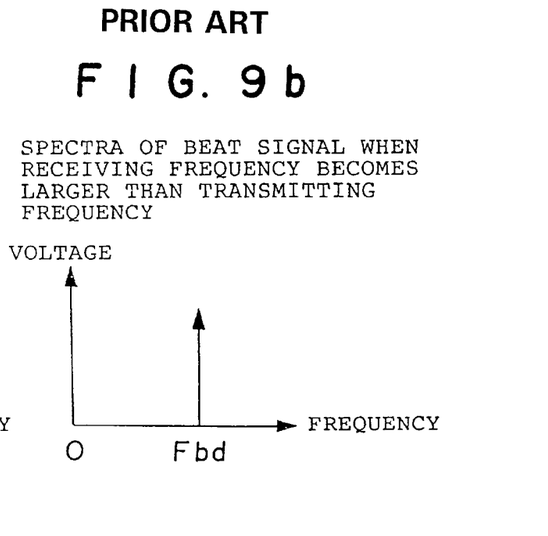
FIG. 9b is a graph for illustrating a frequency spectrum of a beat signal when transmitting frequency is decreased in the conventional onboard radar apparatus.

Further, reference V designates a velocity. The receiving signal 101 relates to a case of V=0, and the receiving signal 102 relates to a case of V≧0. Reference Fo designates a fundamental frequency. Further, when the object has a relative velocity, a receiving electromagnetic wave has a Doppler shift by Fd with respect to a transmitting electromagnetic wave. Accordingly, components of frequency included in a beat signal mixed by the mixer 7 include a frequency difference Fbu between the transmitting signal and the receiving signal in case that the frequency is increased as illustrated in FIG. 9a, and the components include a frequency difference Fbd between the transmitting signal and the receiving signal in case that the frequency is decreased as illustrated in FIG. 9b. A relative range R and a relative velocity V of the target can be obtained in accordance with Formula 1 using the above Fbu, Fbd, Tm, B, the light velocity C of $3.0 \times 10^8$ m/s, a wavelength $\lambda$ of carrier wave, for example, $\lambda = 5.0 \times 10^{-3}$ m in case of the fundamental frequency $F_0 = 60$ GHz.

$$R = \frac{Tmc}{8B}(Fbu + Fbd), V = \frac{\lambda}{4} \quad \text{Formula 1}$$

In the next, provided that resolution powers, meaning minimum steps of data values discretely outputted, of the relative range R and the relative velocity V are expressed respectively by $\Delta R$ and $\Delta V$, these are obtainable by Formula 2.

$$\Delta R = \frac{C}{2B}, \Delta V = \frac{\lambda}{Tm} \quad \text{Formula 2}$$

When a plurality of objects exist, components of frequency as much as the number of the objects are contained in a beat signal when a frequency is increased and/or decreased. In this case, it is necessary to select combinations (FbuA, FbdA), (FbuB, FbdB), . . . among a plurality of components of frequency FbuA, FbuB, . . . for the increased frequency and a plurality of components of frequency FbdA, FbdB, . . . for the decreased frequency and to obtain relative ranges R and relative velocities V by Formula 1. At this time, problems occur when the combinations are erroneously selected.

Figure 10:
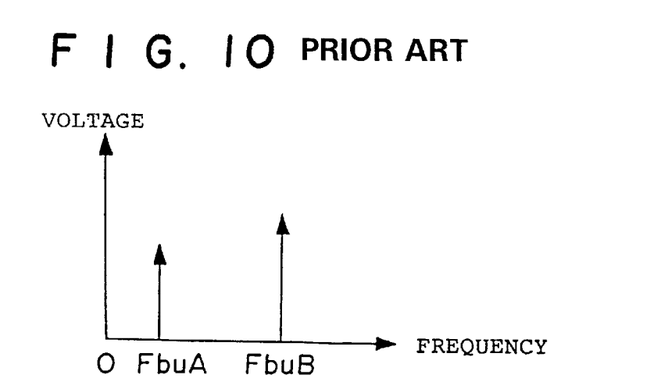
FIG. 10 is a graph of frequency spectra of beat signals when a transmitting frequency is increased in case that two objects exist in the conventional onboard radar apparatus.
Figure 11:
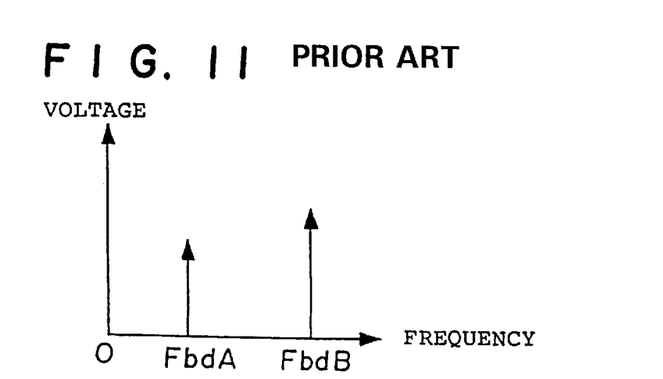
FIG. 11 is a graph for illustrating frequency spectra of beat signals when the transmitting frequency is decreased in case that two objects exist in the conventional onboard radar apparatus.

For example, when two objects A, B exist, components of frequency FbuA, FbuB concerning increased frequency appear as illustrated in FIG. 10, and components of frequency FbdA, FbdB concerning decreased frequency appear as illustrated in FIG. 11. If FbdA and FbdB are erroneously combined, a relative range and a relative velocity of other than actually existing objects A, B are calculated, wherein such relative range and relative velocity are named false images.

For readiness, the references Tm, B and $\lambda$ are determined so that Formula 1 is transformed to be:

$$R = Fbu + Fbd \text{ (m)}, V = Fbu - Fbd \text{ (km/h)} \quad \text{Formula 3}$$

Figure 12:
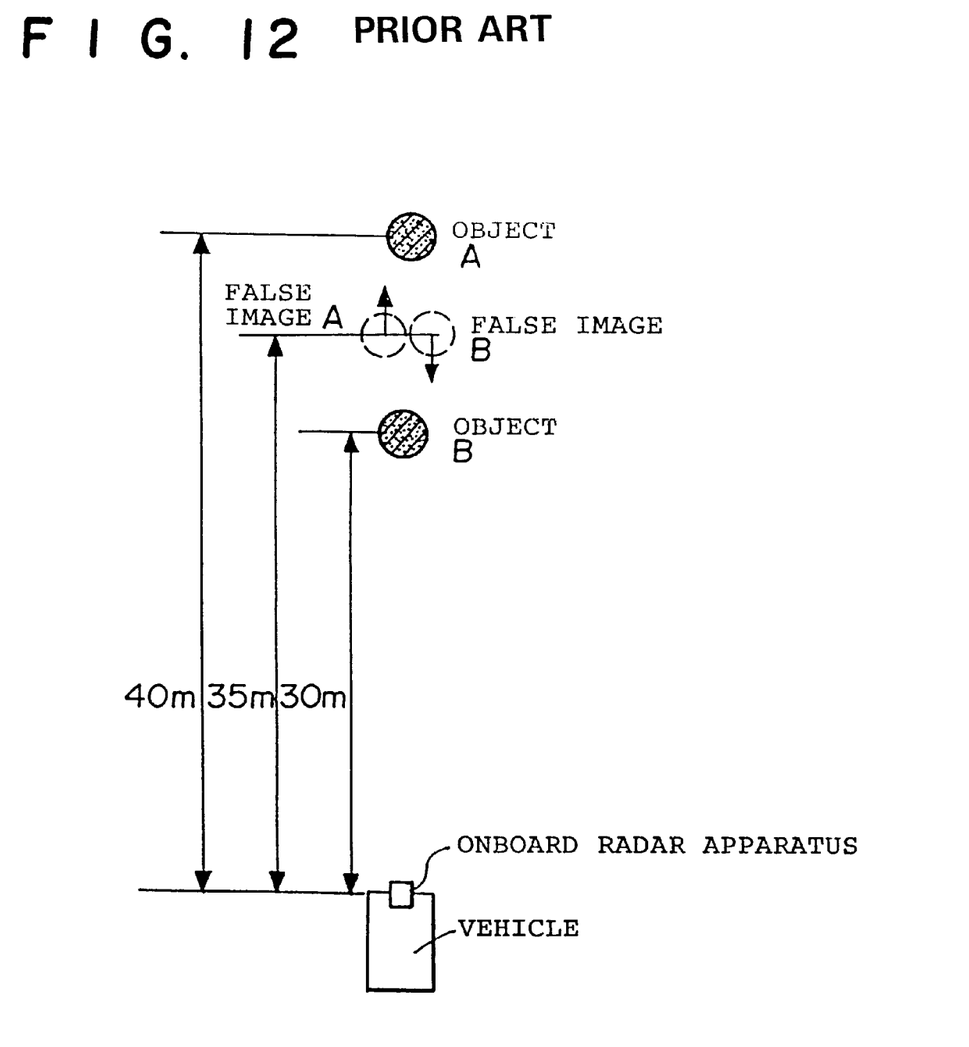
FIG. 12 is a chart for illustrating a situation causing false images in case that two objects exist in the conventional onboard radar apparatus.

Provided that an object A having a relative range of 40 m and a relative velocity of 0 km/h and an object B having a relative range 30 m and a relative velocity of 0 km/h exist as illustrated in FIG. 12, the following results are obtained by calculating Formula 3 backward:

FbuA=15; FbdA=15; FbuB=20; and FbdB=20.

When combinations of (FbuA, FbdA) and (FbuB, FbdB) are correctly selected, the relative ranges and the relative velocities of the objects A, B can be correctly determined. However, when combinations of (FbuA, FbdB) and (FbuB, FbdA) are selected, a false image A having a relative range of 35 m and a relative velocity of 5 km/h in a leaving direction and a false image B having a relative range of 35 m and a relative velocity of −5 km/h in an approaching direction are obtained by Formula 3 as illustrated in FIG. 12.

In order to manage such a problem, for example, JP-A-4-343084 discloses a method of sampling components of frequency FbuA, FbuB concerning increased frequency and components of frequency FbdA, FbdB concerning decreased frequency by analyzing the frequencies using a fast Fourier transformation (FFT) or the like and selecting a combination having relatively small differences of signal levels utilizing an aspect that the signal levels of objects are different.

However, when the two objects A, B were detected by the above-mentioned conventional radar apparatus, in case that signal levels of the two objects A, B were coincidentally close, in other words the components of frequency FbuA, FbuB concerning the increased frequency and the components of frequency FbdA, FbdB concerning the decreased frequency had the same signal levels, it became impossible to determine combinations in reference of differences of the signal levels and false images were made by calculating relative ranges and relative velocities based on erroneous combinations of (FbuA, FbdB) and (FbuB, FbdA).

SUMMARY OF THE INVENTION

It is an object of the present invention to solve the above-mentioned problems inherent in the conventional technique ant to provide an onboard radar apparatus which can judge and delete false images when these are produced and to avoid combinations of components of frequency concerning increased frequency and components of frequency concerning decreased frequency producing false images in succeeding measurement by memorizing the relative ranges and relative velocities of the false images.

According to a first aspect of the present invention, there is provided an onboard radar apparatus comprising: a transmitting and receiving device for transmitting electromagnetic waves toward objects and receiving the electromagnetic waves reflected by the objects, and a signal processing device for calculating relative ranges and relative velocities of the objects based on transmitting electromagnetic waves and receiving electromagnetic waves, wherein false images are determined by comparing relative velocities, calculated from differences between the relative ranges of the objects in previous measurement and the relative ranges of the objects in present measurement, with relative velocities of the objects, calculated based on the transmitting electromagnetic waves and the receiving electromagnetic waves in the present measurement; the determinations are repeated; and these false images are deleted from outputs.

According to a second aspect of the present invention, the transmitting and receiving device picks beat signals of the transmitting electromagnetic waves and the receiving electromagnetic waves concerning increased frequency and beat signals of the transmitting electromagnetic waves and the receiving electromagnetic waves concerning decreased frequency respectively by transmitting and receiving electromagnetic waves subjected to frequency modulation using triangular waves; and the signal processing device calculates relative velocities of the objects based on components of frequency respectively contained in the two beat signals.

According to a third aspect of the present invention, the signal processing device memorizes relative ranges and relative velocities of false images obtained in previous measurement and calculates relative ranges and relative velocities while avoiding calculating relative ranges and relative velocities producing the false images in reference of contents of the memory in present measurement to thereby reduce probability of occurrence of the false images.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

A detailed explanation will be given of preferred embodiments of the present invention in reference to FIGS. 1 through 12 as follows, wherein the same numerical references are used for the same or the similar portions and description of these portions is omitted.

EMBODIMENT 1

Figure 1:
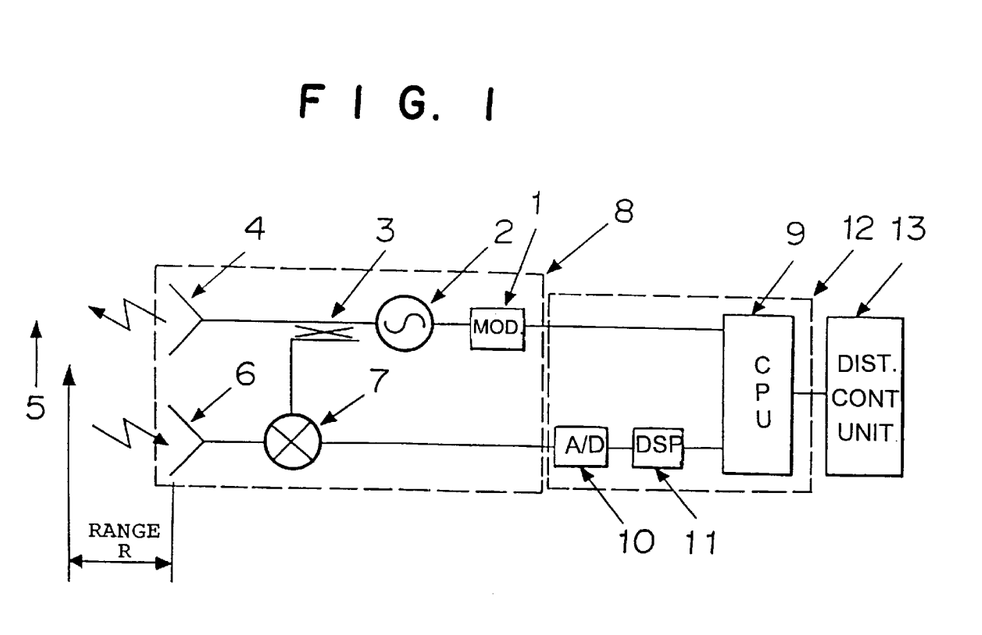
FIG. 1 is a block chart for showing a device for controlling distances between vehicles utilizing an onboard radar apparatus according to Embodiment 1 of the present invention.

FIG. 1 illustrates a device for controlling distances between vehicles utilizing an onboard radar apparatus according to Embodiment 1. In FIG. 1, numerical reference 1 designates a modulator; numerical reference 2 designates a voltage-controlling oscillator; numerical reference 3 designates a power divider; numerical reference 4 designates a transmitting antenna; numerical reference 5 designates an object; numerical reference 6 designates a receiving antenna; numerical reference 7 designates a mixer; numerical reference 8 designates a transmitting and receiving device composed of numerical references 1 through 4, 6, and 7; numerical reference 9 designates a CPU; numerical reference 10 designates an A/D converter; numerical reference 11 designates a digital signal processor (DSP); numerical reference 12 designates a signal processing device composed of numerical references 9 through 11; and numerical reference 13 designates a unit for controlling distances between vehicles.

Figure 2:
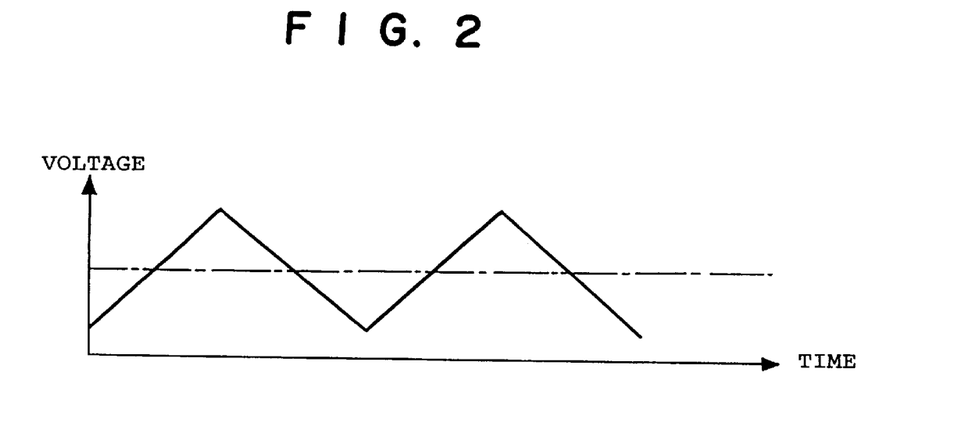
FIG. 2 is a graph of waveform for illustrating outputs of a modulator according to Embodiment 1 of the present invention.
Figure 3:
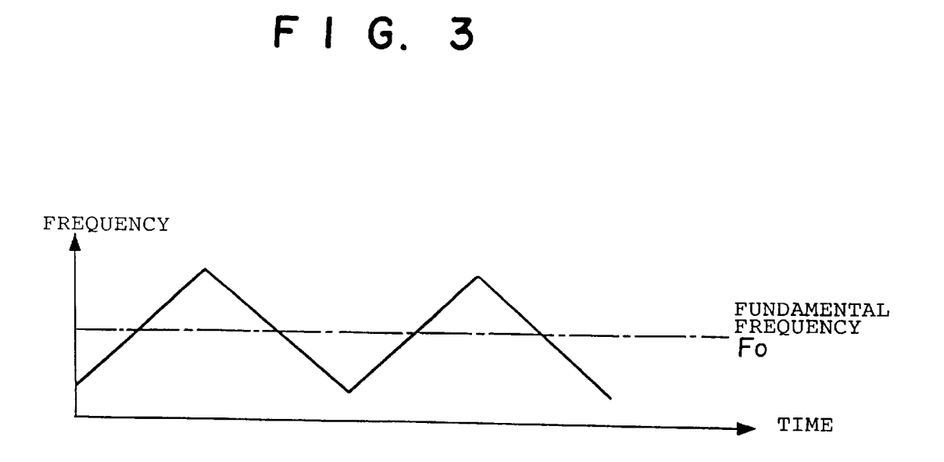
FIG. 3 is a graph of waveform for illustrating outputs of a voltage-controlling oscillator according to Embodiment 1 of the present invention.
Figure 4:
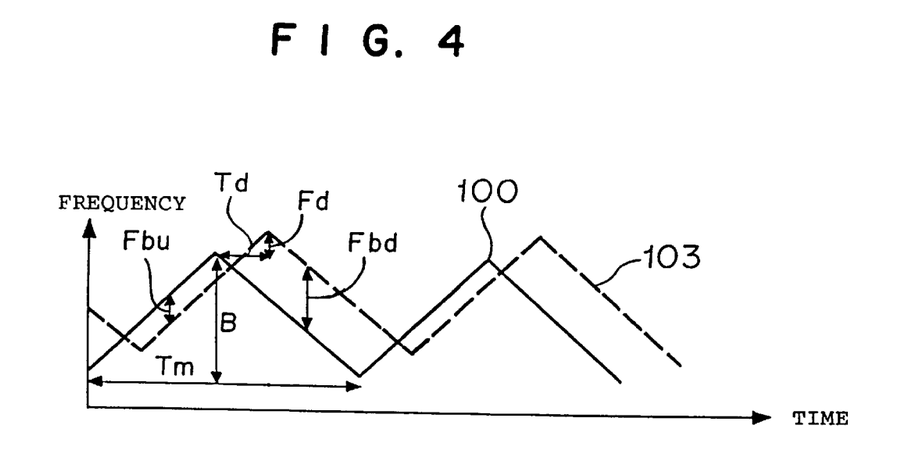
FIG. 4 is a graph of waveform for illustrating a transmitting electromagnetic wave and a receiving electromagnetic wave according to Embodiment 1 of the present invention.

In the next, operations of thus constructed device will be explained. The modulator 1 outputs linear voltage signals for frequency modulation being a triangular wave as illustrated in FIG. 2. The voltage-controlling oscillator 2 generates electromagnetic waves as illustrated in FIG. 3, wherein the electromagnetic waves are subjected to frequency modulation by the above voltage signals for frequency modulation. The electromagnetic waves are divided into two portions by the power divider 3, wherein one of the portions is inputted in the mixer 7 and the other is outputted to space through the transmitting antenna 4. The portion of electromagnetic wave outputted from the transmitting antenna 4 to space is reflected by the object 5 existing at a position apart by a range R and inputted in the receiving antenna 6 with a delay time Td depending on the range R in comparison with the transmitting electromagnetic wave 100 as illustrated in FIG. 4. At this time, when the object 5 has a relative velocity with respect to the radar apparatus, a receiving electromagnetic wave 103 is inputted in the receiving antenna 6 with a Doppler shift as much as Fd with respect to the transmitting electromagnetic wave. The receiving electromagnetic wave received by the receiving antenna 6 is mixed with the transmitting electromagnetic wave from the power divider 3 by the mixer 7 to thereby output beat signals in correspondence with the delay time Td and the Doppler shift Fd.

A beat signal concerning increased frequency is sampled by the A/D converter 10. The sampled signal is subjected to FFT by DSP 11 to thereby calculate components of frequency of the beat signal. Similarly, component of frequency of a beat signal concerning decreased frequency is calculated. A relative range and a relative velocity between the object 5 and the radar apparatus are calculated from the components of frequency of the beat signal concerning increased frequency and the components of frequency of the beat signal concerning decreased frequency by the CPU 9. Further, the CPU 9 specifies a false image, deletes the false image from data of the objects, determines a target object among the objects, and transmits a relative range and a relative velocity of the target objects to the unit for controlling distances between vehicles 13. The unit for controlling distances between vehicles 13 adjusts an own velocity based on the relative range and the relative velocity of target objects transmitted from the CPU 9 by adjusting an opening degree of throttle valve and/or operating a breaking actuator, whereby a safe distance from the target object can be maintained.

Figure 5:
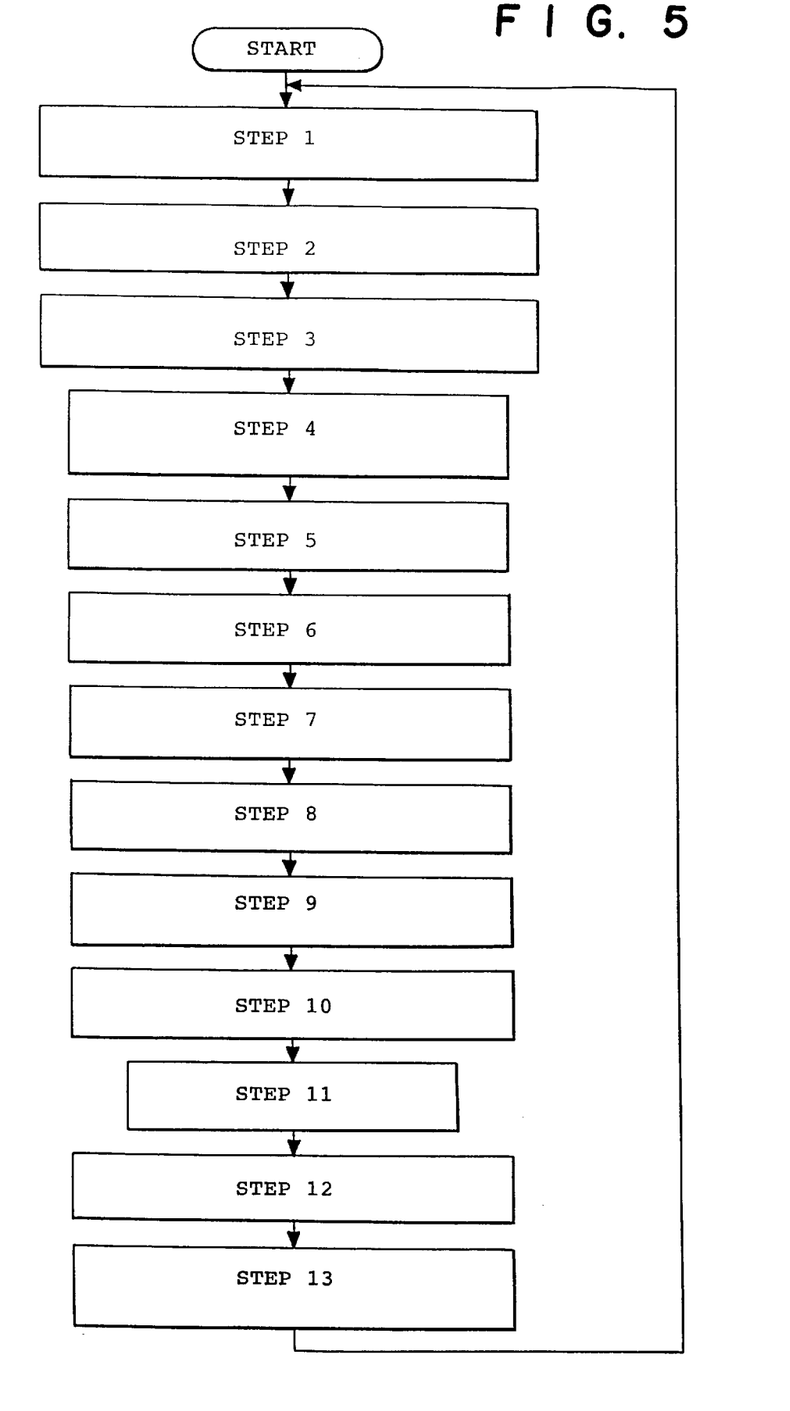
FIG. 5 is a flow chart for illustrating signal processing operations in a signal processing device according to Embodiment 1 of the present invention.

Operations of processing signals in thus constructed radar apparatus will be described in reference of a flow chart illustrated in FIG. 5. In FIG. 5, the beat signal concerning increased frequency outputted from transmitting and receiving device 8 is sampled by the A/D converter 10, and is subjected to FFT by the DSP 11 to thereby calculate components of frequency as much as Nu, Fbu (1), Fbu (2), . . . , Fbu (Nu) in Step 1.

Similarly, in Step 2, components of frequency as much as Nd, Fbd (1), Fbd (2), . . . , Fbd (Nd) are calculated from the beat signal concerning decreased frequency outputted from the transmitting and receiving device 9.

In Step 3, the CPU 9 determines combinations of the components of frequency of the beat signal concerning increased frequency, Fbu (1), Fbu (2), . . . , Fbu (Nu) and the components of frequency of the beat signal concerning decreased frequency Fbd (1), Fbd (2), . . . , Fbd (Nd).

In Step 4, the CPU 9 calculates relative ranges R and relative velocities V, respectively of objects, from the combinations determined in Step 3 from Formula 1.

In Step 5, the CPU 9 judges identical objects. In other words, the relative ranges and the relative velocities both of a plurality of objects calculated at present measurement are compared with the relative ranges and the relative velocities of a plurality of objects calculated in previous measurement, and the identical objects are determined when a difference between the relative ranges and a difference between the relative velocities are smaller than preset specified values.

In Step 6, the previous objects are deleted when the identical objects are not found, namely the identical objects can not be determined.

In Step 7, the objects, which can not be judged whether or not identical, are determined as newly appeared objects.

In Step 8, the objects, which can be judged whether or not identical, are determined as already appeared objects.

In Step 9, as for each of the already appeared objects, relative velocities V2 obtained from a difference between the relative ranges R (t–Δt) in the previous measurement and the relative ranges R (t) in the present measurement are calculated by Formula 4, where Δt represents a period of measurement.

$$V2 = \frac{R(t) - R(t - \Delta t)}{\Delta t} \quad \text{Formula 4}$$

In Step 10, as for the already appear ed objects, the relative velocities V2, obtained from the difference, and the relative velocities V, calculated in respective measurement by Formula 1, are compared. In case that differences between the relative velocities V2 and V are larger than a predetermined threshold value, namely |V–V2|> threshold value, the already appeared objects a re judged to be false images.

In Step 11, all false images are deleted from the objects.

In Step 12, the relative ranges and the relative velocities both of the objects are memorized in a memory.

In Step 13, target objects are selected among the objects and their relative ranges and relative velocities are sent to the unit for controlling distances between vehicles 13.

As for thus constructed onboard radar apparatus, a situation illustrated in FIG. 12 will be described. As already described, the object A has the relative range of 40 m and the relative velocity of 0 km/h and the object B has the relative range of 30 m and the relative velocity of 0 km/h. Since the relative velocities of the objects A, B are 0 km/h, there is no time variability of the relative ranges. Meanwhile, as described in BACKGROUND OF THE INVENTION of this specification, the false images A, B also do not have time variability of the relative ranges and relative velocities V2 obtained from differences between the relative ranges become 0 km/h. However, relative velocities V of the false images A, B, calculated by Formula 1, become respectively 5 km/h and –5 km/h, which are different from the relative velocities V2 of 0 km/h, whereby it is possible to judge the false images.

In thus constructed onboard radar apparatus, even though false images are produced by wrong combinations, it is possible to remove the false images by the judgments, whereby occasions to pursue the false images can be substantially reduced.

EMBODIMENT 2

Figure 6:
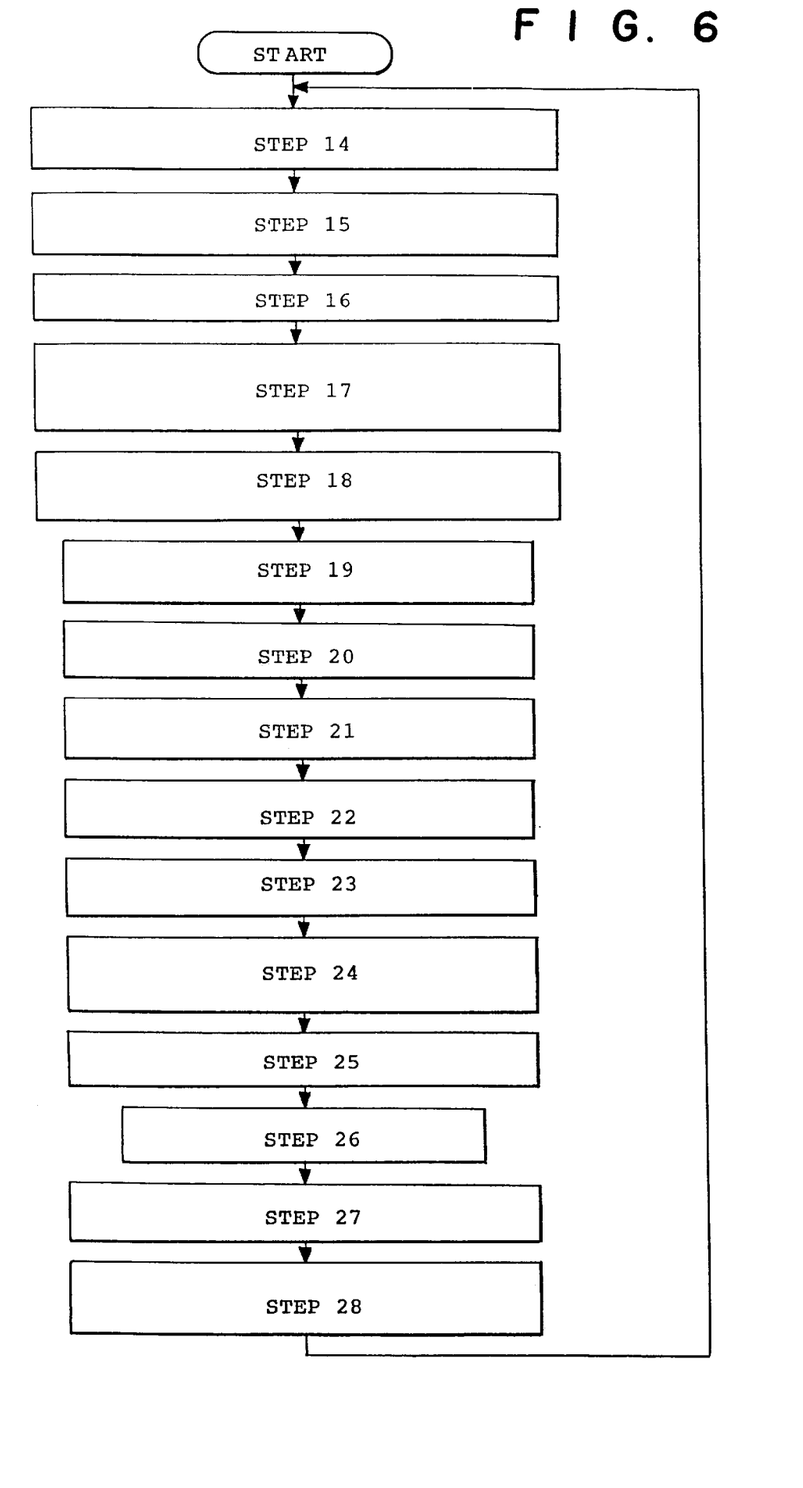
FIG. 6 is a flow chart for illustrating signal processing operations in a signal processing device according to Embodiment 2 of the present invention.

FIG. 6 is a flow chart for illustrating signal processing operations of a radar apparatus according to Embodiment 2 of the present invention. At first, a beat signal concerning increased frequency outputted from a transmitting and receiving device 8 is sampled by an A/D converter 10 and are subjected to FFT by a DSP 11 to calculate components of frequency as much as Nu, Fbu (1), Fbu (2), . . . , Fbu (Nu) in Step 14. Similarly, in Step 15, components of frequency as much as Nd, Fbd (1), Fbd (2), . . . , Fbd (Nd) are calculated from beat signals concerning decreased frequency outputted from the transmitting and receiving device 8.

In Step 16, relative ranges and relative velocities of previous false images are taken out of a memory.

In Step 17, the components of frequency Fbu (1), Fbu (2), . . . , Fbu (Nu) of the beat signal concerning increased frequency and the components of frequency Fbd (1), Fbd (2), . . . , Fbd (Nd) of the beat signal concerning decreased frequency are combined. At this time, combinations of Fbu (1), Fbu (2), . . . , Fbu (Nu) and Fbd (1), Fbd (2), . . . , Fbd (Nd) are determined so that differences between the relative ranges and the relative velocities of the previous false images do not become the threshold values or less.

In Step 18, a CPU 9 calculates relative ranges R and relative velocities V of objects from the combinations determined in Step 17 by Formula 1.

In Step 19, the CPU 9 judges identical objects. In other words, relative ranges and relative velocities of a plurality of objects measured and calculated at present measurement with relative ranges and relative velocities of a plurality of objects previously measured and calculated in order to judge the identical objects when a difference between the relative ranges and a difference between the relative velocities are respectively smaller than preset threshold values.

In Step 20, previous objects, which are not judged to be the identical objects, are deleted.

In Step 21, objects, which are not judged the identical in the present measurement, are recognized as newly appeared objects.

In Step 22, objects, which are judged the identical in the present measurement, are recognized as already appeared objects.

In Step 23, a relative velocity V2 is calculated for each of the already appeared objects by Formula 4, which relative velocity is based on a difference between a previous relative range R (t−Δt) and a present relative range R (t), where periods of measurement are Δt:

$$V2 = \frac{R(t) - R(t - \Delta t)}{\Delta t} \quad \text{Formula 4}$$

In Step 24, as for the already appeared objects, the relative velocities V2 based on differences are compared with the relative velocities V calculated at each of the measurement by Formula 1. When the differences are larger than a predetermined threshold value, i.e. |V−V2|> threshold value, such already appeared objects satisfying this are judged to be false images.

In Step 25, relative ranges and relative velocities of all false images are memorized in the memory.

In Step 26, all false images are deleted from objects.

In Step 27, relative ranges and relative velocities of the objects are memorized in the memory.

In Step 28, target objects are selected from the objects, and relative ranges and relative velocities of the target objects are sent to a unit for controlling distances between vehicles 13.

In thus constructed onboard radar apparatus, even though false images are produced by erroneously combining components of frequency, it is possible to judge the false images and remove these, whereby occurrences of pursuing the false images can be substantially reduced. Further, it is possible to reduce probability of occurrence of the false images itself.

Although a case that the onboard radar apparatus according to the present invention is utilized in a device for controlling distances between vehicles has been described, the apparatus can be utilized in a device for alerting distances between vehicles, which alerts when a danger is judged using relative ranges and relative velocities of candidates of vehicles to be pursued and an onboard radar apparatus enabling to detect not only a front of vehicle but also sides and a back thereof.

As described, the invention provides an onboard radar apparatus having high reliability.

Further, the present invention provides an effect of reducing production of false images.

Obviously, numerous modifications and variations of the present invention are possible in light of the above teachings. It is therefore to be understood that within the scope of the appended claims, the invention may be practiced otherwise than as specifically described herein.

What is claimed is:

1. An onboard radar apparatus comprising: a receiving and transmitting device for transmitting electromagnetic waves to objects and receiving the electromagnetic waves reflected by the objects repeatedly, and a signal processing device for calculating relative ranges and relative velocities of the objects based on the transmitting electromagnetic waves and the receiving electromagnetic waves, wherein false images are judged by comparing relative velocities, calculated from differences between the relative ranges of the objects in previous measurement and the relative range s of the objects in current measurement, with said relative velocities of the objects, calculated based on the transmitting electromagnetic waves and the receiving electromagnetic waves at each measurement, and succeedingly the false images are deleted from outputs of the apparatus.

2. The onboard radar apparatus according to claim 1, wherein said transmitting electromagnetic waves are subjected to frequency modulation by triangular waves;

said transmitting and receiving device take beat signals out of said transmitting and receiving electromagnetic waves being shifted; and said signal processing device calculates the relative velocities of the objects based on components of frequency respectively contained in the beat signals.

3. The onboard radar apparatus according to claim 1, wherein said signal processing device memorizes relative ranges and relative velocities of false images in the previous measurement and further calculates relative ranges and relative velocities of objects while avoiding to calculate relative ranges and relative velocities of false images in reference of memorized in said memory in the current measurement, to thereby reduce probability of occurrence of the false images.

4. The onboard radar apparatus according to claim 2, wherein said signal processing device memorizes relative ranges and relative velocities of false images in the previous measurement and further calculates relative ranges and relative velocities of objects while avoiding to calculate relative ranges and relative velocities of false images in reference of memorized in said memory in the current measurement, to thereby reduce probability of occurrence of the false images.

5. An onboard radar apparatus comprising: a receiving and transmitting device for repeatedly measuring objects by transmitting electromagnetic waves to objects and receiving the electromagnetic waves reflected by the objects, and a signal processing device for calculating relative ranges and relative velocities of the objects based on the transmitting electromagnetic waves and the receiving electromagnetic waves to distinguish the objects, wherein false images obtained by erroneously distinguishing the objects are judged by comparing their relative velocities, calculated from differences between the relative ranges of the objects corresponding to first measurement and the relative ranges of the objects corresponding to second measurement, with said relative velocities of the objects, calculated based on the transmitting electromagnetic waves and the receiving electromagnetic waves in the second measurement; and thus judged false images are deleted from outputs of the apparatus in the second measurement.

6. The onboard radar apparatus according to claim 5, wherein said transmitting electromagnetic waves are subjected to frequency modulation by triangular waves;

said transmitting and receiving device takes beat signals out of said transmitting and receiving electromagnetic waves, generated when the frequency of receiving electromagnetic waves are increased and decreased in comparison with said transmitting electromagnetic wave; and said signal processing device calculates the relative velocities of the objects based on components of frequency respectively contained in the beat signals.

7. The onboard radar apparatus according to claim 5, wherein said signal processing device memorizes relative ranges and relative velocities of false images corresponding to the first measurement and further calculates relative ranges and relative velocities of objects corresponding to the second measurement while avoiding to calculate relative ranges and relative velocities of false images in reference of memorized in said memory, to thereby reduce probability of distinguishing false images.

8. The onboard radar apparatus according to claim 6, wherein said signal processing device memorizes relative ranges and relative velocities of false images corresponding to the first measurement and further calculates relative ranges and relative velocities of objects corresponding to the second measurement while avoiding to calculate relative ranges and relative velocities of false images in reference of memorized in said memory, to thereby reduce probability of distinguishing false images.

* * * * *